(12) United States Patent
Ono et al.

(10) Patent No.: US 10,737,654 B2
(45) Date of Patent: Aug. 11, 2020

(54) AIRBAG DEVICE FOR KNEE PROTECTION

(71) Applicant: TOYODA GOSEI CO., LTD., Kiyosu-shi, Aichi-ken (JP)

(72) Inventors: Minoru Ono, Kiyosu (JP); Tetsuya Ogata, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 57 days.

(21) Appl. No.: 16/231,700

(22) Filed: Dec. 24, 2018

(65) Prior Publication Data

US 2019/0202390 A1 Jul. 4, 2019

(30) Foreign Application Priority Data

Dec. 28, 2017 (JP) .................. 2017-253786

(51) Int. Cl.
| | |
|---|---|
| *B60R 21/206* | (2011.01) |
| *B60R 21/231* | (2011.01) |
| *B60R 21/217* | (2011.01) |
| *B60R 21/237* | (2006.01) |
| *B60R 21/00* | (2006.01) |

(52) U.S. Cl.
CPC .......... *B60R 21/206* (2013.01); *B60R 21/217* (2013.01); *B60R 21/231* (2013.01); *B60R 21/237* (2013.01); *B60R 21/2176* (2013.01); *B60R 2021/0004* (2013.01); *B60R 2021/0051* (2013.01); *B60R 2021/23169* (2013.01)

(58) Field of Classification Search
CPC .... B60R 21/206; B60R 21/217; B60R 21/231
See application file for complete search history.

(56) References Cited

U.S. PATENT DOCUMENTS

2015/0266445 A1 9/2015 Kojima

FOREIGN PATENT DOCUMENTS

| JP | 2003-160015 A | 6/2003 |
|---|---|---|
| JP | 2008-265760 A | 11/2008 |
| JP | 2008-296912 A | 12/2008 |

*Primary Examiner* — Faye M Fleming
(74) *Attorney, Agent, or Firm* — Posz Law Group, PLC

(57) ABSTRACT

A case for housing an inflator includes a protruding region for storing a connector of a wire harness which is connected to an inflator body. A body of the wire harness extends from the connector in a direction orthogonal to an axial direction of the inflator body. The protruding region protrudes from a circumferential wall of the case partially. The protruding region includes a stopper wall that is opposed to the connector as stored in the case in the axial direction of the inflator, and a pair of limiting walls that are engageable with the wire harness by the leading ends and thus limit an angle range with respect to the inflator body within which the wire harness is rotatable. The limiting walls each extend from the stopper wall and are disposed on both sides of the connector in the direction orthogonal to the axial direction of the inflator.

7 Claims, 11 Drawing Sheets

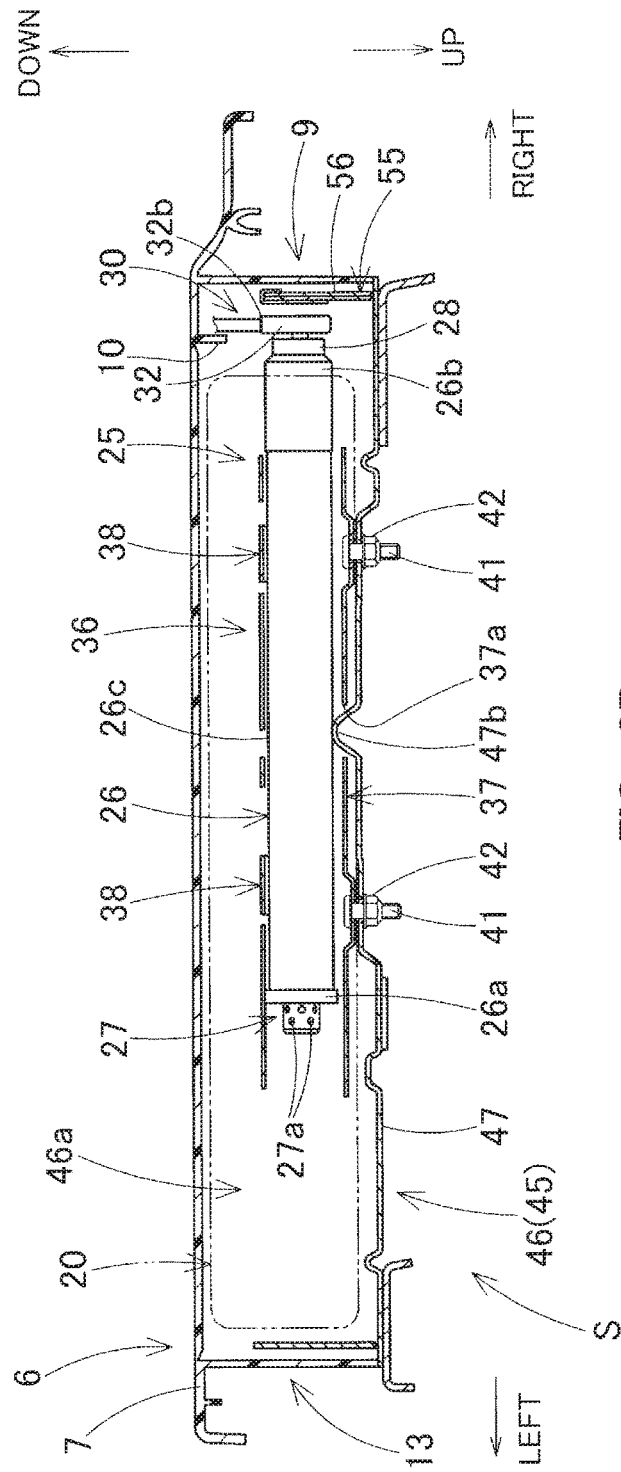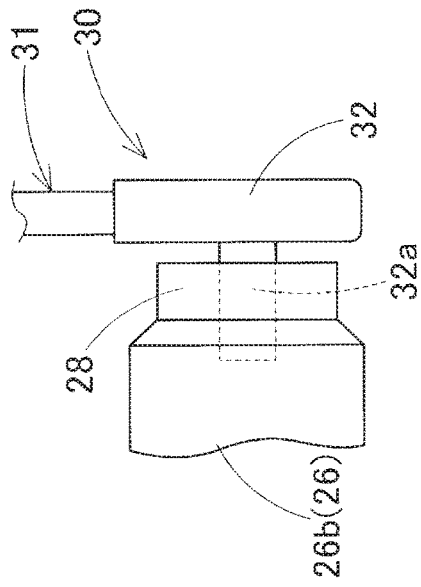

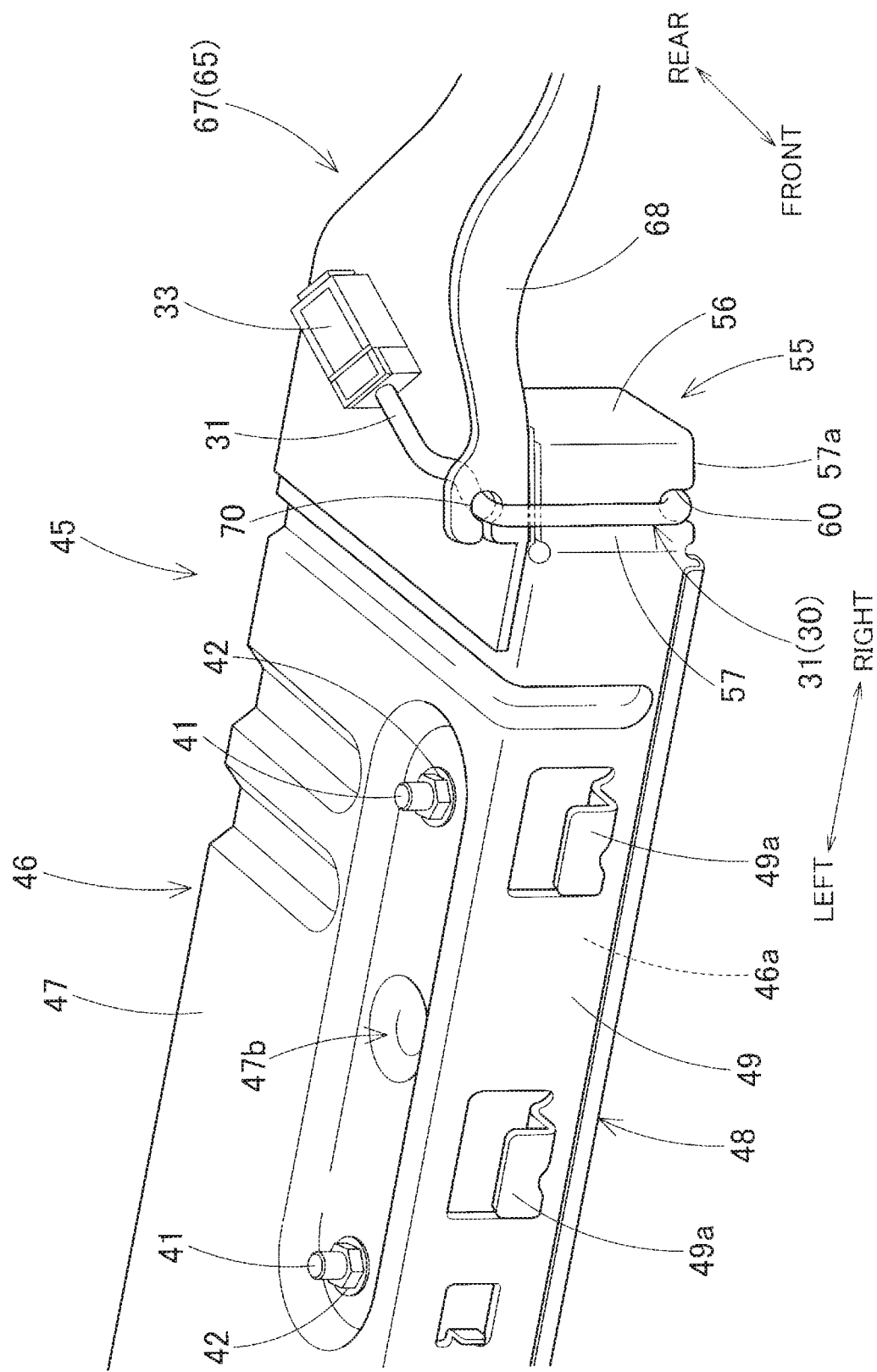

AIRBAG DEVICE FOR KNEE PROTECTION

CROSS REFERENCE TO RELATED APPLICATIONS

The present application claims priority from Japanese Patent Application No. 2017-253786 of Ono, filed on Dec. 28, 2017, the entire disclosure of which is incorporated herein by reference.

BACKGROUND OF THE INVENTION

1. Field of the Invention

The present invention relates to an airbag device for knee protection that includes an airbag in a folded configuration, an inflator for feeding the airbag with an inflation gas, and a case which stores the airbag and inflator.

2. Description of Related Art

JP 2015-178320A discloses a known airbag device for knee protection that includes an airbag, an inflator for feeding the airbag with an inflation gas, a case which stores the airbag and inflator, and an airbag cover for covering the airbag as stored in the case. When the airbag device is mounted on a vehicle, a wire harness extending from an airbag actuating circuit, more particularly, a connector of the wire harness, is connected to a connection port of the inflator as stored in the case. To enable this, the case is provided with an opening which exposes the connection port of the inflator and thus enables the connector of the wire harness to be connected to the connection port. The case further includes, in a periphery of the opening, a member that prevents the inflator from dropping out of the case via the opening.

Airbag devices of this kind are usually connected with a wire harness after being assembled and mounted on the vehicle. However, depending on circumstances of the vehicle on which an airbag device is to be mounted, a wire harness sometimes needs to be connected to an inflator as has not been assembled into an airbag module, in advance of mounting on the vehicle. In that instance, the inflator needs to be stored in a case, as connected with the wire harness. Measures to prevent the inflator from dropping out of the case and measures to position the wire harness with respect to the case have to be taken also in this instance.

SUMMARY OF THE INVENTION

An object of the present invention is to provide, in an airbag device for knee protection in which an inflator is stored in a case, as connected with a wire harness in advance for mounting on a vehicle, a configuration that is able to prevent the inflator from dropping out of the case at actuation of the inflator, and that provides ease of handling of the wire harness and ease of positioning of the wire harness with respect to the case.

The airbag for knee protection of the invention includes an airbag that is folded up, an inflator that feeds the airbag with an inflation gas, a case that houses the airbag and the inflator, and a wire harness that is connected to the inflator for connection with an airbag actuating circuit of the vehicle.

The case includes a generally quadrangular bottom wall, a generally square tubular circumferential wall that extends from a circumferential edge of the bottom wall, and an emergence opening which allows the airbag to be deployed therefrom.

The inflator includes:
- a generally cylindrical inflator body that includes a plurality of gas discharge ports disposed at a first end in an axial direction of the inflator body, and a connection port disposed at a second end in the axial direction for connection with the wire harness; and
- a retainer that is used to mount the inflator body and the airbag on the case, the retainer including a holding section which clamps an outer circumference of the inflator body, and a mounting means that protrudes from the holding section in a direction orthogonal to the axial direction of the inflator body.

The inflator is mounted on the case by fixing the mounting means to the bottom wall of the case.

The wire harness includes a connector that is connected to the connection port of the inflator body and a harness body that extends from the connector in the direction orthogonal to the axial direction of the inflator body for connection with the airbag actuating circuit.

The case further includes a protruding region that protrudes partially from the circumferential wall for housing the connector of the wire harness, and the protruding region includes:
- a stopper wall that is opposed to the connector of the wire harness in the axial direction of the inflator body and prevents the inflator body from dropping out of the case; and
- a pair of limiting walls that extend from the stopper wall and are disposed on both sides of the connector in the direction orthogonal to the axial direction of the inflator body, each of the limiting walls being engageable with the wire harness by a leading end thereof and limiting a range of angle with respect to the inflator body within which the wire harness is rotatable.

The airbag device for knee protection of the invention is configured such that the inflator is stored in the case, as connected with the wire harness, in advance of mounting on the vehicle. To this end, the case includes, in the circumferential wall, the protruding region that protrudes partially from the circumferential wall for housing the connector of the wire harness, and the protruding region includes the stopper wall that is opposed to the connector in the axial direction of the inflator body. In the event that the inflator body moves outwardly or backward in the axial direction when the inflator is actuated, the stopper wall abuts against the inflator body and prevents the inflator body from further moving outwardly, thus holding an end plane of the connector adequately such that the inflator body may not drop out of the retainer or airbag. The protruding region further includes a pair of the limiting walls that extend from the stopper wall and are disposed on both sides of the connector in the direction orthogonal to the axial direction of the inflator body. The leading ends of the limiting walls are engageable with the wire harness and limit the range of angle with respect to the inflator body within which the wire harness, which extends in the direction orthogonal to the axial direction of the inflator body, is rotatable. With this configuration, merely by storing the inflator body as connected with the wire harness in the case, the limiting walls limit the angle range within which the wire harness can move, such that the wire harness and inflator body are prevented from rotating freely with respect to the retainer. This facilitates handling of the wire harness at the setting of the inflator in the case.

Therefore, the airbag device for knee protection of the invention is able to adequately hold the second end portion of the inflator where the wire harness is disposed, and prevent the inflator as connected with the wire harness and stored in the case from dropping out of the case when the inflator is actuated. Further, the airbag device has ease of handling of the wire harness and ease of positioning of the wire harness with respect to the case.

In the airbag device for knee protection of the invention, it is desired that the protruding region has such a contour that the limiting walls extend towards the stopper wall while reducing a clearance between themselves, as viewed from the front of the emergence opening of the case. Although the case is provided with the protruding region, this configuration limits a size of the protruding region, which contributes to size reduction of the case as well.

In the airbag device for knee protection of the invention, it is also desired that either one of the limiting walls is provided with a first groove that dents from the leading end of the one of the limiting walls, and that the harness body is placed and retained in the first groove. This configuration prevents an airbag cover for lidding the emergence opening from being interfered with the harness body when assembling the airbag device, and also prevents the harness body from rotating with respect to the case during transportation of the airbag device and in mounting of the airbag device on a vehicle. Therefore, handling of the wire harness will be further facilitated.

In the above instance, it is further desired that the harness body is also placed and retained in a second groove that is disposed on the same side as the limiting wall provided with the first groove and at a distance from the first groove. Due to retention by not only the first groove but also the second groove, the harness body will be further prevented from rotating with respect to the case, and prevented from engagement with surrounding members of the vehicle after the airbag device is mounted on board.

The airbag device for knee protection described above is desirably configured to be mounted on a vehicle in a state where the emergence opening of the case faces downwardly and where the harness body is so arranged to extend once downwardly from the connector, pass through the first groove, bend or turn round upward and pass through the second groove which is disposed above the first groove.

With this configuration, if by chance a rainwater becomes attached to the harness body and trickles down the harness body, the rainwater drips down from the lower end, i.e. a bent or turn-round portion, of the wire harness, thus the case will be protected from invasion by the rainwater.

BRIEF DESCRIPTION OF DRAWINGS

FIG. 2A is a schematic enlarged horizontal sectional view of the airbag device of FIG. 1 taken along a left and right direction of the vehicle;

FIG. 2B is a partial enlarged view of FIG. 2A showing a vicinity of a connection port of an inflator;

FIG. 11 is a schematic partial enlarged perspective view showing the way the wire harness as connected to the inflator is placed through a first groove and a second groove of the case.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
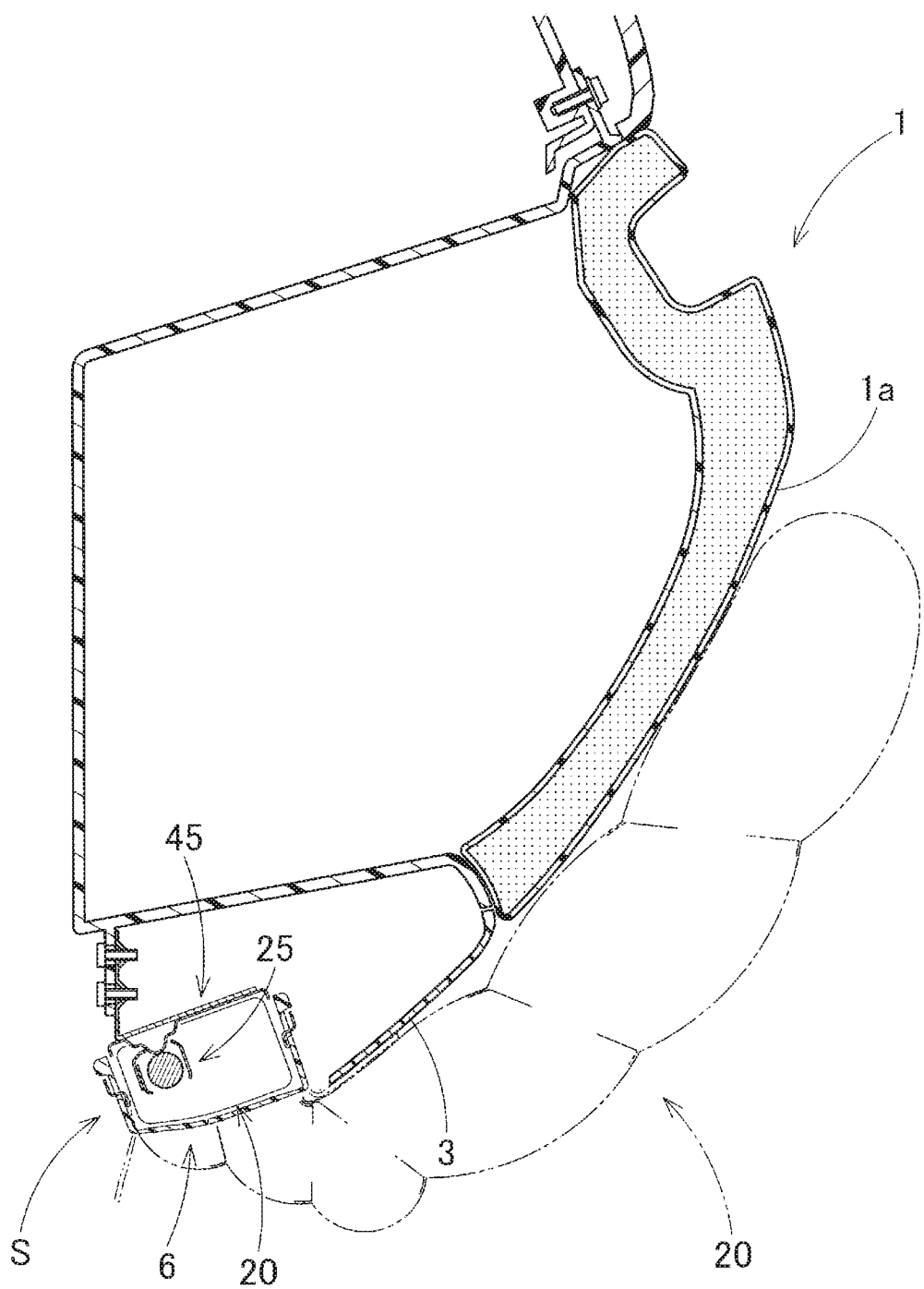
FIG. 1 is a schematic vertical sectional view of an airbag device for knee protection embodying the invention as mounted on a vehicle, the view being taken along a front and rear direction of the vehicle.

An airbag device S for knee protection embodying the invention will be described herein as mounted in front of a passenger seat of a vehicle, for the illustrative purpose. As shown in FIG. 1, the airbag device S is mounted beneath a glove box 1 which is disposed in front of the passenger seat. Unless otherwise specified, up/down, left/right and front/rear directions in this specification are intended to refer to up/down, left/right and front/rear directions of the vehicle.

As shown in FIGS. 1 to 4, the airbag device S includes an airbag 20, which is in a folded configuration, an inflator 25 for feeding the airbag 20 with an inflation gas, a case 45 for storing the airbag 20 and inflator 25, and an airbag cover 6 for covering an emergence opening 46a of the case 45.

Figure 10:
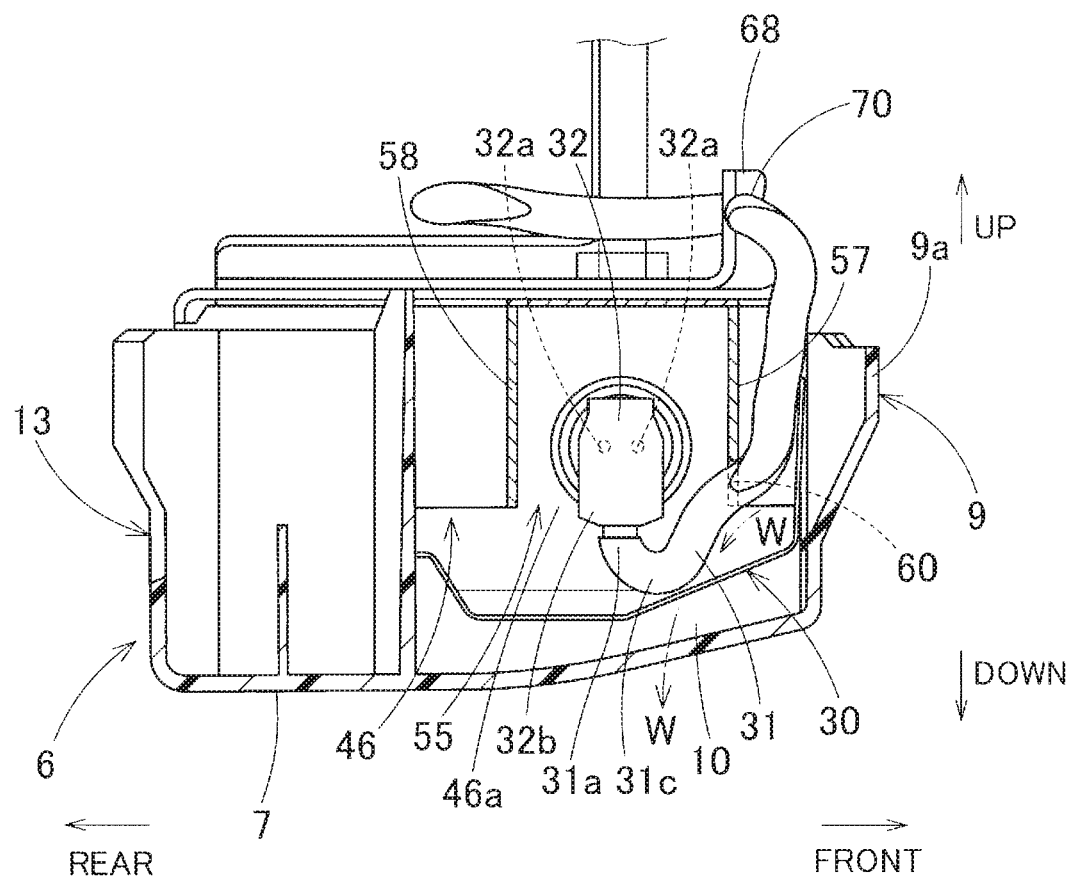
FIG. 10 is a schematic partial enlarged vertical sectional view of the airbag device taken at a location of the protruding region of the case.

The airbag cover 6 is fabricated of synthetic resin such as thermoplastic elastomer of polyolefin. As can be seen in FIGS. 2 to 5, the airbag cover 6 includes a covering region 7 for covering the emergence opening 46a of the case 45, and a side wall 13 that extends upwardly from a circumferential edge of the covering region 7 and covers a later-described circumferential wall 48 of the case 45 from outside. The covering region 7 includes a double door 8 which is operable forward and rearward at airbag deployment and a protruding cover section 9 for covering a later-described protruding region 55 of the case 45. The protruding cover section 9 is disposed in a vicinity of the right end of the covering region 7 as mounted on the vehicle. A partition wall 10, which extends upwardly, is disposed generally along a front and rear direction between the door 8 and protruding cover section 9, as can be seen in FIGS. 2 and 10. The side wall 13 is formed into a generally square tubular contour so as to cover front, rear, left and right sides of the circumferential wall 48 of the case 45. A front wall 14 and a rear wall 15 of the side wall 13, which are opposed to each other in a front and rear direction, are each provided with four retaining holes 14a/15a for receiving later-described retaining hooks 49a/50a of the circumferential wall 48 of the case 45. The retaining holes 14a and 15a are arranged along a left and right direction on each of the front wall 14 and rear wall 15. The protruding cover section 9 is formed by making a part of a right side wall 16 of the side wall 13 protrude outwardly so as to cover the protruding region 55 of the case 45. As can be seen in FIG. 5, a front wall 9a of the protruding cover section 9 protrudes farther forward than the front wall 14 of the side wall 13 of the airbag cover 6 such that a void space is formed between the front wall 9a and a later-described front limiting wall 57 of the protruding region 55 of the case 45. As described later, a harness body 31 of a wire harness 30 connected to the inflator 25 is inserted in the void space, as can be seen in FIGS. 5 and 10.

In the illustrated embodiment, the airbag 20 is formed of a flexible fabric woven with polyester, polyamide yarns or the like. The airbag 20 is stored in the case 45 in a folded configuration, and is designed to emerge from the case 45 and be deployed upward for protecting knees of a vehicle occupant. More particularly, the airbag 20 is designed to be deployed rearwardly and upwardly to cover a rear surface 1a of the glove box 1 for protecting knees and shins of the occupant, as indicated with double-dotted lines in FIG. 1. Although not described in detail nor depicted in the drawings, a portion of the airbag 20 to stay in the case 45 (more particularly, in a case body 46) at airbag deployment is provided with a plurality of insert holes for receiving bolts 41 of the retainer 36, an aperture for receiving a later-described supporting projection 47b of the case 45 and an insert opening via which a body 26 of the inflator 25 is inserted into the airbag 20.

Figure 3:
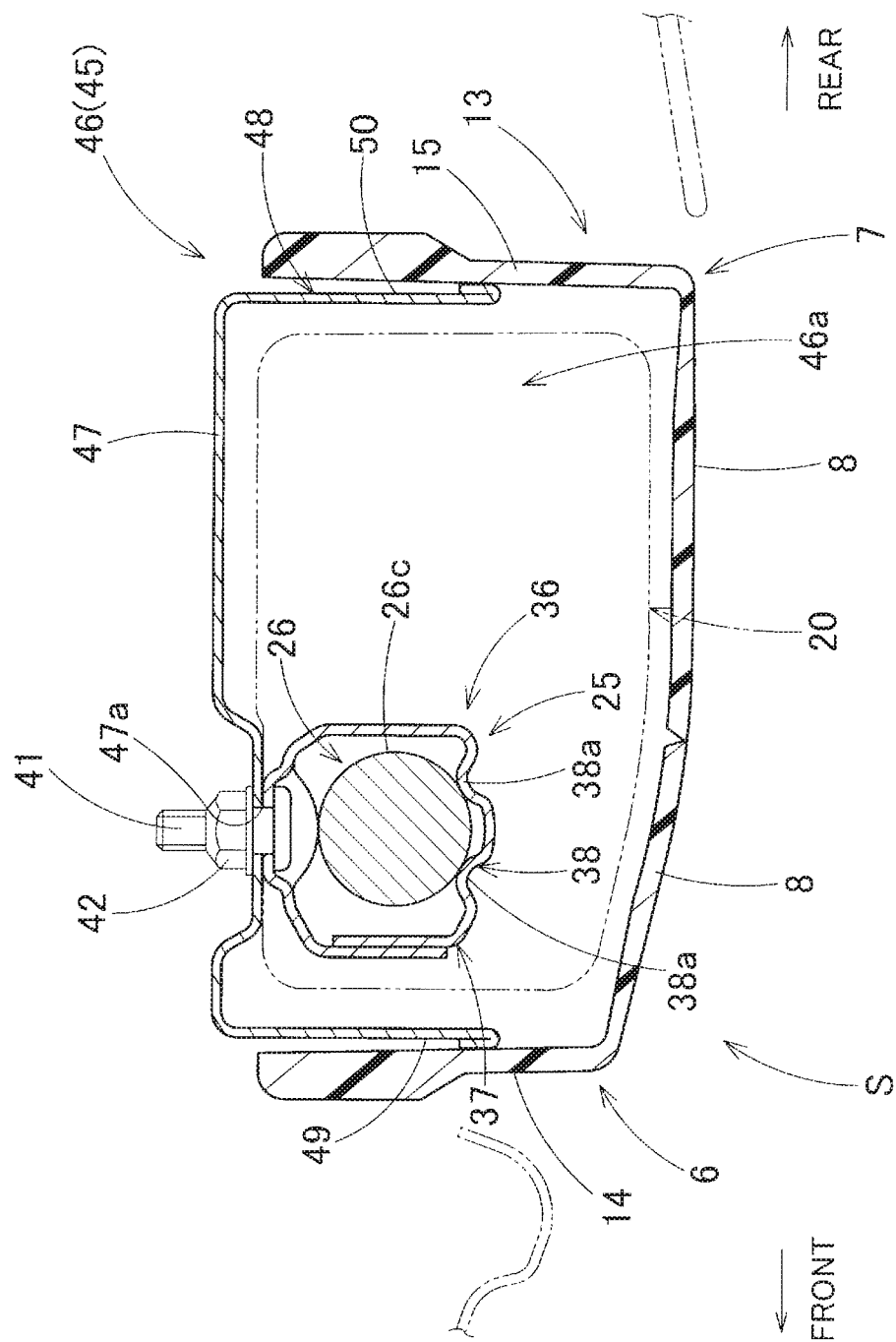
FIG. 3 is a schematic enlarged vertical sectional view of the airbag device of FIG. 1, taken at a location of a bolt of a retainer.
Figure 4:
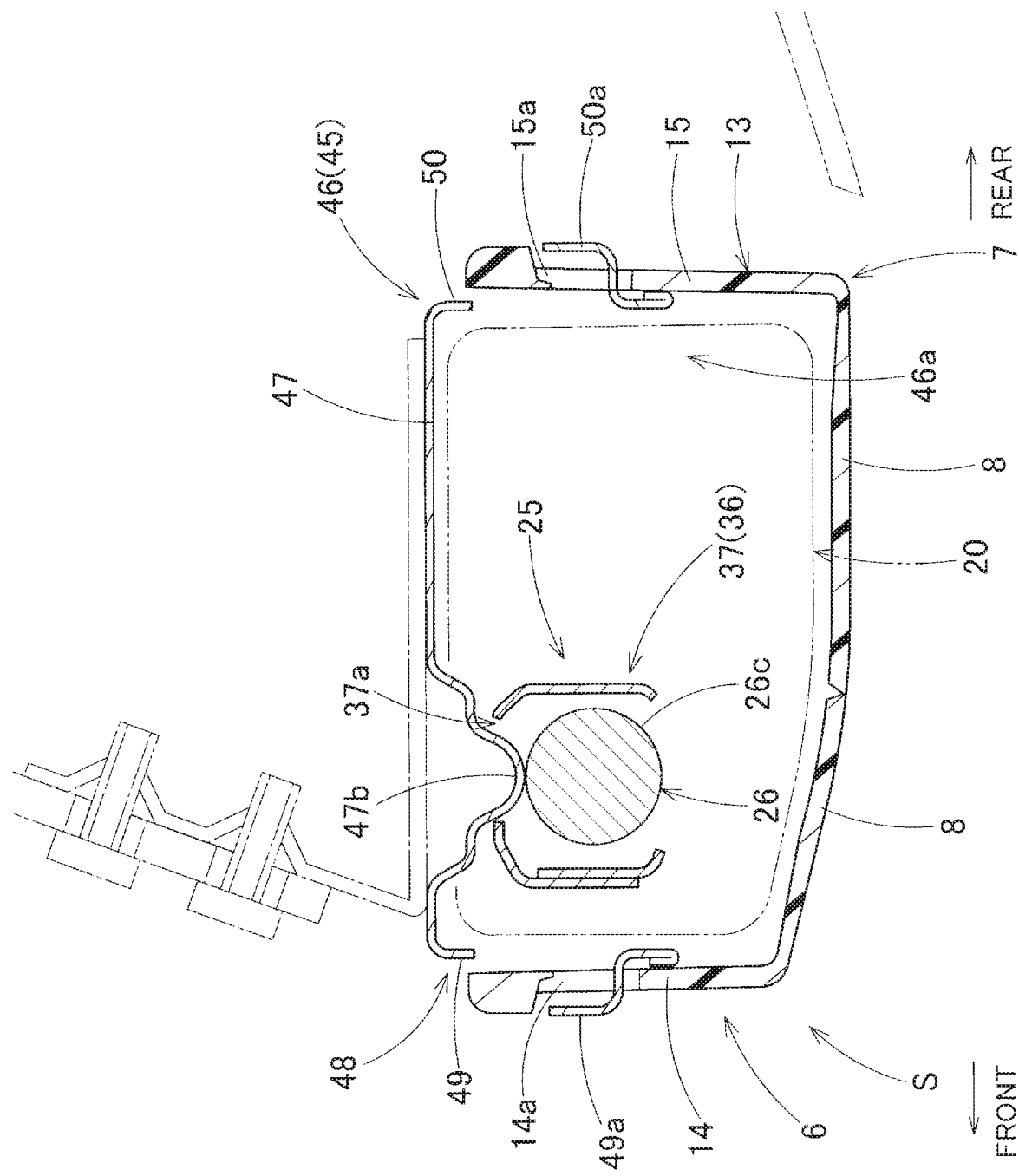
FIG. 4 is a schematic enlarged vertical sectional view of the airbag device of FIG. 1, taken at a location of a supporting projection formed on a bottom wall of a case.
Figure 5:
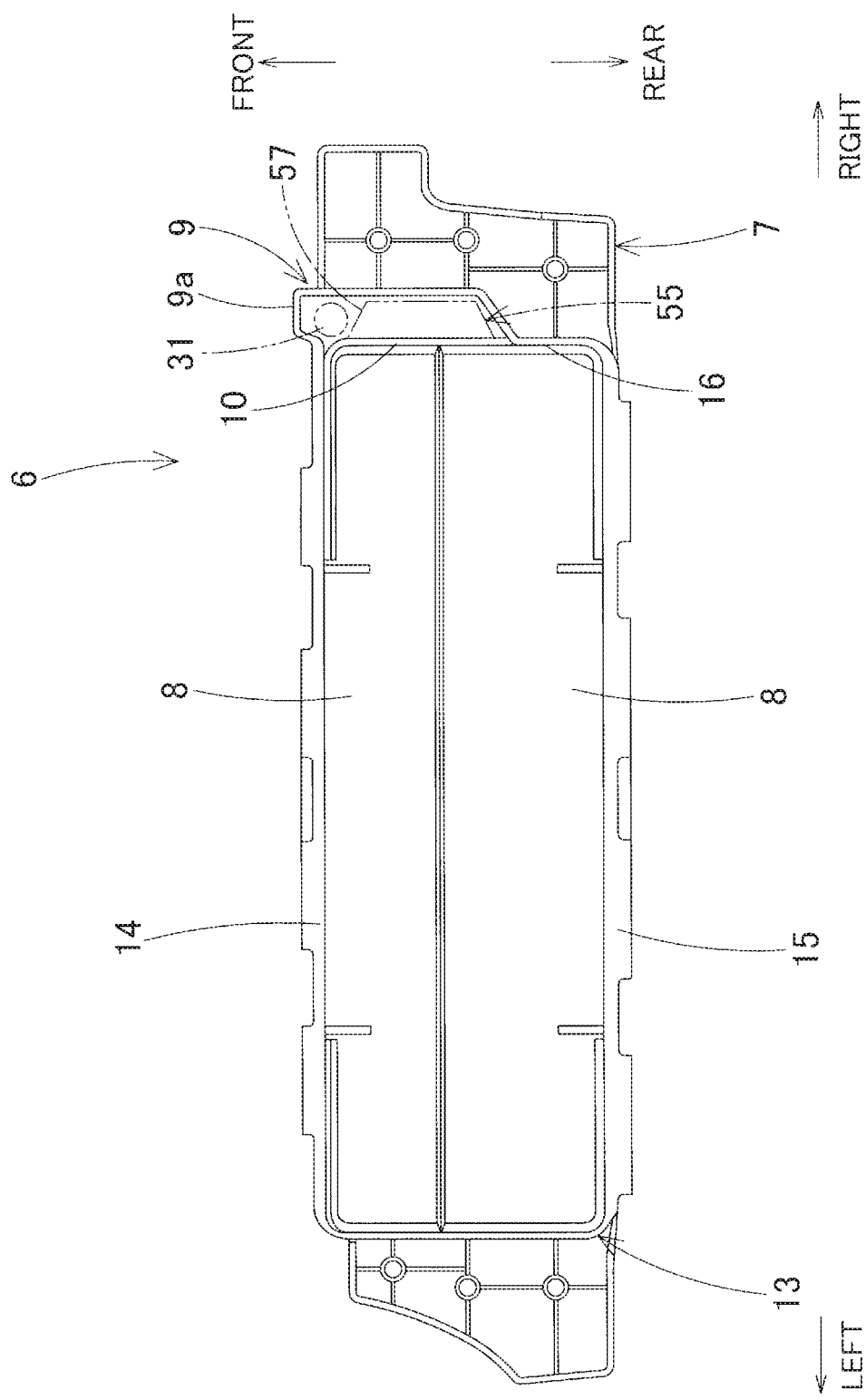
FIG. 5 is a plan view of an airbag cover for use in the airbag device of the embodiment.

As can be seen in FIGS. 2 to 4, the inflator 25 includes a generally cylindrical body 26 and a retainer 36 which is used to mount the body 26 on the case 45.

The inflator body 26 is formed generally into a cylinder and is adapted to be disposed along a left and right direction of the vehicle. The inflator body 26 includes a gas releasing section 27 at the first end in an axial direction (at the left end 26a, in the illustrated embodiment) and includes a connection port 28 at the second end in the axial direction (i.e. at the right end 26b). A wire harness 30 for connection with a lead wire (not shown) extending from a suitable airbag actuating circuit is connected to the connection port 28. The gas releasing section 27 protrudes from a left end 26a of the inflator body 26 and has a smaller diameter than the inflator body 26, and includes numerous gas discharge ports 27a. The inflator body 26 is designed to be mounted on and stored in the case 45, as connected with the wire harness 30 in advance, through the use of the retainer 36.

The wire harness 30 includes a harness body 31 and a connector 32 which is disposed at the leading end (or first end) 31a of the body 31 and connected to the connection port 28 of the inflator body 26, As can be seen in FIGS. 2 and 10, the connector 32 is provided with a two-pin plug 32a. By inserting the plug 32a into the connection port 28, the connector 32 is connected to the inflator body 26 in an unrotatable fashion with respect to the inflator body 26. The connector 32 is formed into a contour like a generally rectangular plate. When the plug 32a is inserted into the connection port 28 of the inflator body 26, the connector 32 is so arranged that the length direction extends in an up and down direction (in other words, along an axial direction of the circumferential wall 48 of the case 45), and the harness body 31 extends from a lower end 32b of the connector 32, as can be seen in FIG. 10. As can be seen in FIGS. 10 and 11, the harness body 31 once extends downwardly from the connector 32, then goes through a first groove 60 formed in the case 45 (more particularly, in a case body 46 of the case 45), extends upward on an outer surface of the case body 46, and then goes through a second groove 70 which is disposed generally immediately above the first groove 60 as the airbag device S is mounted on board, thus the harness body 31 is arranged along an outer surface of a later-described front limiting wall 57 of the case body 46, generally in an up and down direction. When the airbag device S is mounted on the vehicle, the harness body 31 is passed through the void space between the front limiting wall 57 of the case 45 and the right side wall 16 of the side wall 13 of the airbag cover 6. The wire harness 30 further includes, at the second end 31b, another connector 33 for connection to the lead wire (not shown) extending from the actuating circuit. In the illustrated embodiment, the connector 33 is fixed to a top plane of a later-described right bracket 67 of the case 45 with a temporary fixing means (not shown) such as an adhesive tape when mounted on the vehicle, as shown in FIG. 11.

Referring to FIGS. 2 to 4, the retainer 36 includes a holding section 37 which holds the inflator body 26 and two bolts 41 as mounting means which protrude from the holding section 37 generally in a direction orthogonal to an axial direction of the holding section 37.

The holding section 37 is formed of a sheet metal generally into a hollow tube elongated in a left and right direction. The holding section 37 includes, at its portion disposed above the inflator body 26 as mounted on board and between the bolts 41, a through hole 37a for receiving a later-described supporting projection 47b formed on a bottom wall 47 of the case 45. The holding section 37 further includes, at a position opposed to the bolt 41 in a portion disposed beneath the inflator body 26 as mounted on board, a butt region 38 which abuts against an outer circumferential place 26c of the inflator body 26 when the inflator 25 is mounted on the case 45, The holding section 37 includes two such butt regions 38 corresponding to the two bolts 41 as shown in FIG. 2. As can be seen in the sectional view taken along a front and rear direction in FIG. 3, each of the butt regions 38 includes two projections 38a which are disposed generally along the front and rear direction in a generally lower half area of the holding section 37. Each of the projections 38a is formed by denting a portion of the holding section 37 towards the inflator body 26 so as to have a generally arcuate sectional contour. A leading end of each of the projections 38a is brought into abutment with the outer circumferential plane 26c of the inflator body 26 when the inflator 25 is mounted on the case 45.

In the airbag device S of the illustrated embodiment, the inflator 25 and airbag 20 are mounted on the case 45 by firstly inserting the retainer 36 into the airbag 20, inserting the inflator body 26 as connected with the wire harness 30 into the holding section 37 of the retainer 36 inside the airbag 20, then placing the airbag 20 in the case 45 such that the bolts 41 of the retainer 36 go through the bottom wall 47 of the case 45, and then fastening the bolts 41 with nuts 42. More specifically, when the bolts 41 are fastened with the nuts 42, the supporting projection 47b formed on the bottom wall 47 of the case 45 and the butt regions 38 formed on the holding section 37 of the retainer 36 clamp the inflator body 26, thus the retainer 36 holds the inflator body 26 tightly.

Figure 6:
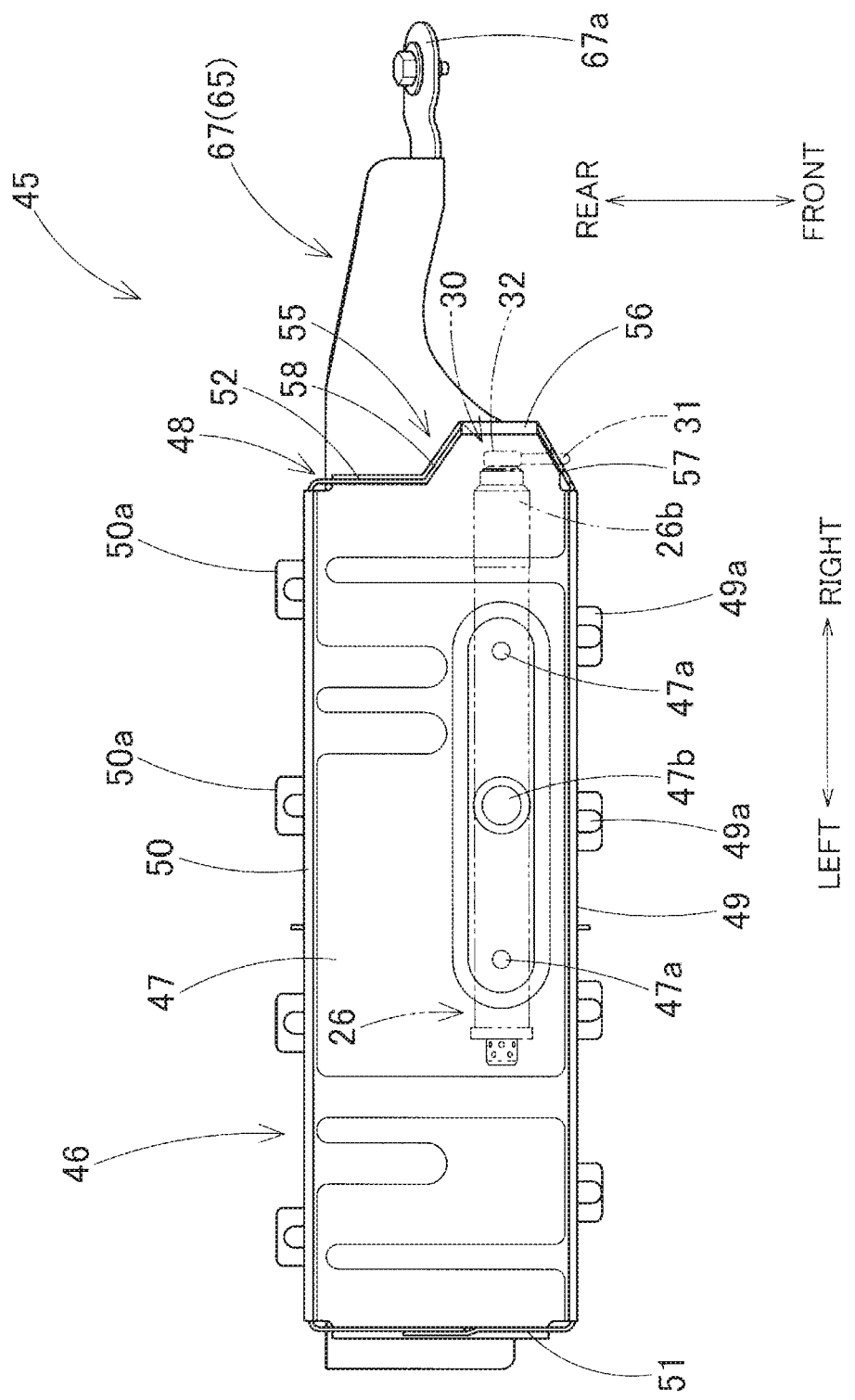
FIG. 6 is a bottom view of a case for use in the airbag device of the embodiment.
Figure 7:
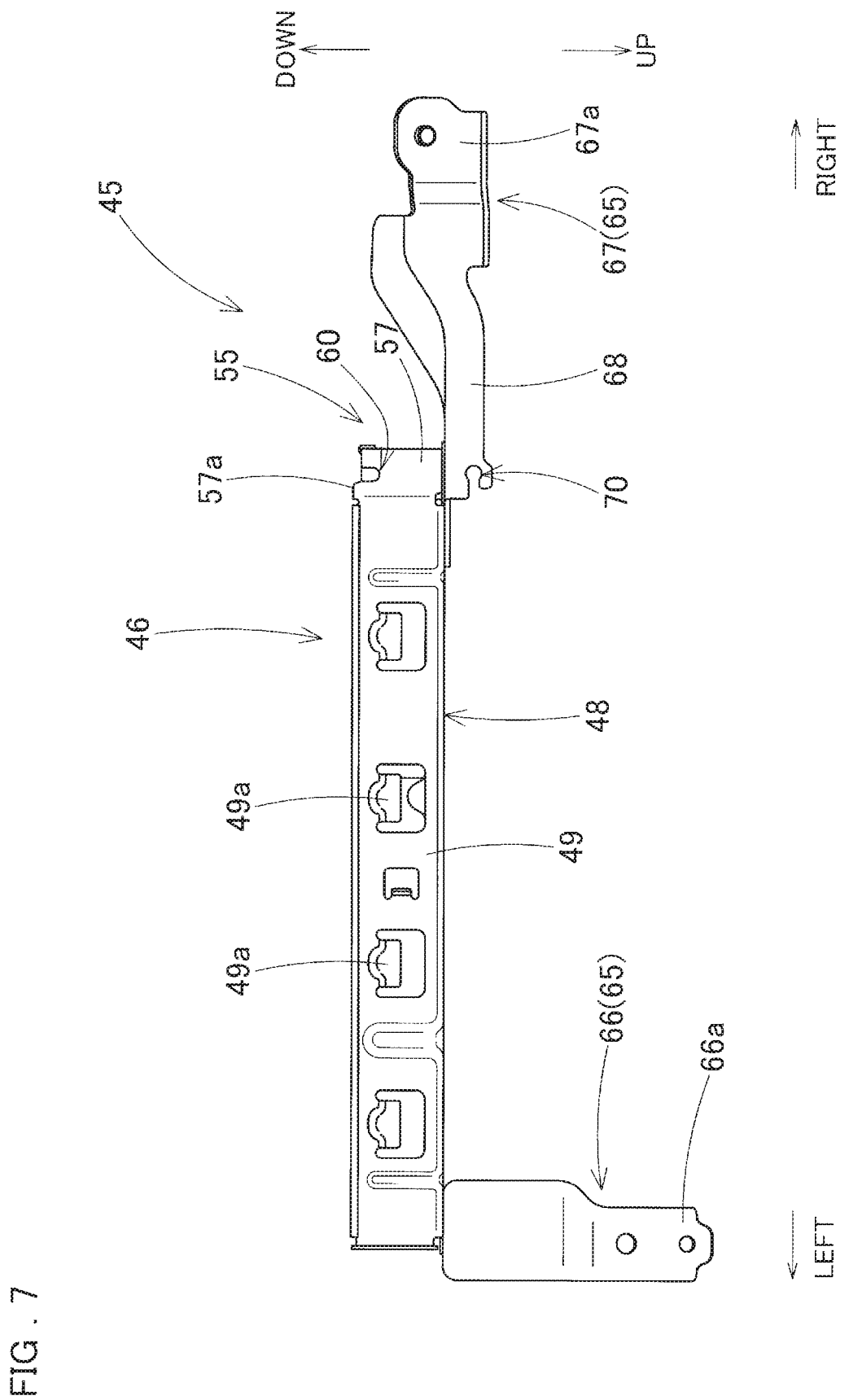
FIG. 7 is a front view of the case of FIG. 6.

Referring to FIGS. 6 and 7, the case 45 includes a case body 46 and a bracket section 65 which is used to mount the case body 46 on an underside of the glove box (i.e. vehicle body structure) 1.

The case body 46 is formed generally into such a box that includes a generally quadrangular bottom wall 47, a generally square tubular circumferential wall 48 which extends from a circumferential edge of the bottom wall 47, and an emergence opening 46a which allows the airbag to be deployed therefrom. As mounted on board, the emergence opening 46a is disposed at the lower side, as can be seen in FIGS. 3 and 4. That is, the circumferential wall 48 extends downwardly from the circumferential edge of the bottom wall 47. As can be seen in FIGS. 1, 3 and 4, in the illustrated embodiment, the inflator 25 is disposed in an area of the case body 46 towards the front relative to the center in a front and rear direction. To this end, the case body 46 includes, in a front area of the bottom wall 47, two insert holes 47a for receiving the bolts 41 of the retainer 36 of the inflator 25, and a supporting projection 47b which protrudes inwardly (i.e. towards the inflator body 26) generally along a protruding direction of the bolt 41. The supporting projection 47b has a generally arcuate sectional contour as can be seen in FIGS. 2 and 4, and supports the inflator body 26 by making the leading end abut against the outer circumferential plane 26c of the inflator body 26. The supporting projection 47b is formed generally at the center of a space between the insert holes 47a.

The circumferential wall 48 includes a front wall 49 and a rear wall 50 which are opposed to each other in a front and rear direction and a left side wall 51 and a right side wall 52 which are opposed to each other in a left and right direction. Each of the front wall 49 and rear wall 50 is provided, in a vicinity of the lower end, with a plurality of hooks 49a/50a for engagement with peripheries of the retaining holes 14a/15a formed in the front wall 14/rear wall 15 of the airbag cover 6. The hooks 49a protrude outwardly forward while the hooks 50a protrude outwardly rearward, and each of the hooks 49a and 50a is so bent that the leading end faces upward, thus having a generally L shaped sectional shape. In the illustrated embodiment, the front wall 49 and rear wall 50 each include four hooks 49a and 50a, lined up in the left and right direction.

As can be seen in FIG. 6, the circumferential wall 48 includes, in the right side wall 52, a protruding region 55 for storing the connector 32 of the wire harness 30. The protruding region 55 is formed by making a front part of the right side wall 52 protrude towards the right, and includes a stopper wall 56 that is opposed to the connector 32 in the axial direction of the inflator body 26 as set in the case 45 (i.e. in the left and right direction), a front limiting wall 57 and a rear limiting wall 58 that extend from both sides of the stopper wall 56 and are disposed on both sides of the connector 32 in a direction orthogonal to the axial direction of the inflator 25 (i.e. on front and rear sides of the connector 32). In the illustrated embodiment, the stopper wall 56 extends generally along the front and rear direction on the right side of the connector 32 to face the connector 32, and has a greater width in the front and rear direction than that of the connector 32.

The front limiting wall 57 and rear limiting wall 58 are engageable with the harness body 31 by the leading ends 57a and 58a. This way the front limiting wall 57 and rear limiting wall 58 regulate or limit a range of angle with respect to the inflator body 26 as stored in the case 45 in which the harness body 31 of the wire harness 30, which extends in the direction orthogonal to the axial direction of the inflator body 26, is rotatable. To describe more particularly, as viewed from below the emergence opening 46a (i.e. as viewed from an up and down direction), the front limiting wall 57 and rear limiting wall 58 extend towards the stopper wall 56 while coming closer to each other, in other words, while reducing a clearance between themselves, as can be seen in FIG. 6. In the illustrated embodiment, the front limiting wall 57 and rear limiting wall 58 are generally symmetric to each other in the front and rear direction, and an inclination angle of each of the front limiting wall 57 and rear limiting wall 58 with respect to the stopper wall 56 is approximately 60 degrees. Even more specifically, as the inflator 25 is mounted on the case 45, root ends of the front limiting wall 57 and rear limiting wall 58 (ends of the front limiting wall 57 and rear limiting wall 58 facing away from the stopper wall 56) are disposed farther towards the center in the left and right direction of the inflator body 26 than the second end (i.e. right end 26b) of the inflator body 26 where the connection port 28 is located, as viewed from below the emergence opening 46a (i.e. as viewed from an up and down direction), such that the front limiting wall 57 and rear limiting wall 58 cover the front and rear sides of the connector 32 generally all over, as can be seen in FIG. 6. Further, as can be seen in FIG. 10, when viewed from a side of the case 45, a part (or a lower end 32b) of the connector 32 protrudes from the leading ends 57a and 58a of the front limiting wall 57 and rear limiting wall 58 of the protruding region 55.

Figure 9:
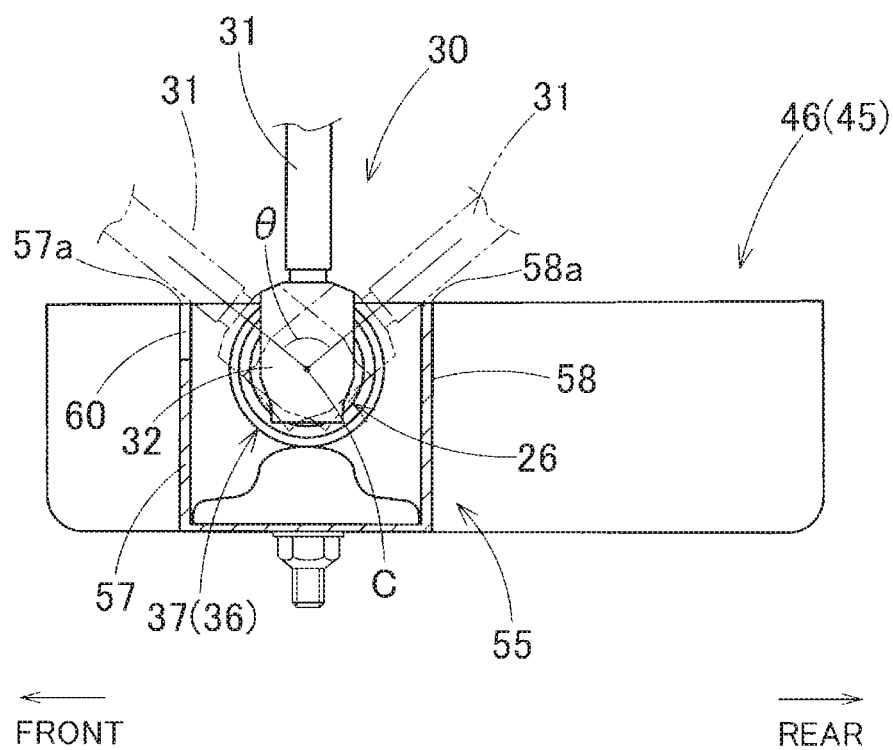
FIG. 9 schematically depicts an inflator body of the airbag device of the embodiment, as connected with a wire harness and stored inside the case.

As described above, the inflator body 26 and retainer 36 of the illustrated embodiment are not tightly fixed to each other until the inflator 25 as housed in the airbag 20 is mounted on the bottom wall 47 of the case 45 by fastening the bolts 41 with the nuts 42. Accordingly, at a point where the inflator 25 as connected with the wire harness 30 is set inside the case 45 via the emergence opening 46a, the inflator body 26 is rotatable inside the retainer 36. That is, at a point where the inflator body 26 is merely inserted into the retainer 36, the wire harness 30 as connected to the inflator body 26 is also rotatable about an axial center C of the inflator body 26, as can be seen in FIG. 9. However, the illustrated embodiment is configured such that the angle range within which the harness body 31 is rotatable with respect to the inflator body 26 is regulated or limited by engagement of the connector 32 or the harness body 31 of the wire harness 30 with the leading end 57a/58a of the front limiting wall 57 or rear limiting wall 58, as indicated with double-dotted lines in FIG. 9. Therefore, the harness body 31 is positioned with respect to the inflator body 26 merely by placing the inflator 25 (i.e. the inflator body 26 as connected with the wire harness 30 and inserted into the retainer 36) as housed in the airbag 20, in the case 45 via the emergence opening 46a. More particularly, due to engagement with the leading end 57a/58a of the front limiting wall 57 or rear limiting wall 58, the angle 6 (FIG. 9) that the harness body 31 as stored in the case 45 is rotatable with respect to the inflator body 26 is limited to approximately 100 degree.

Figure 8:
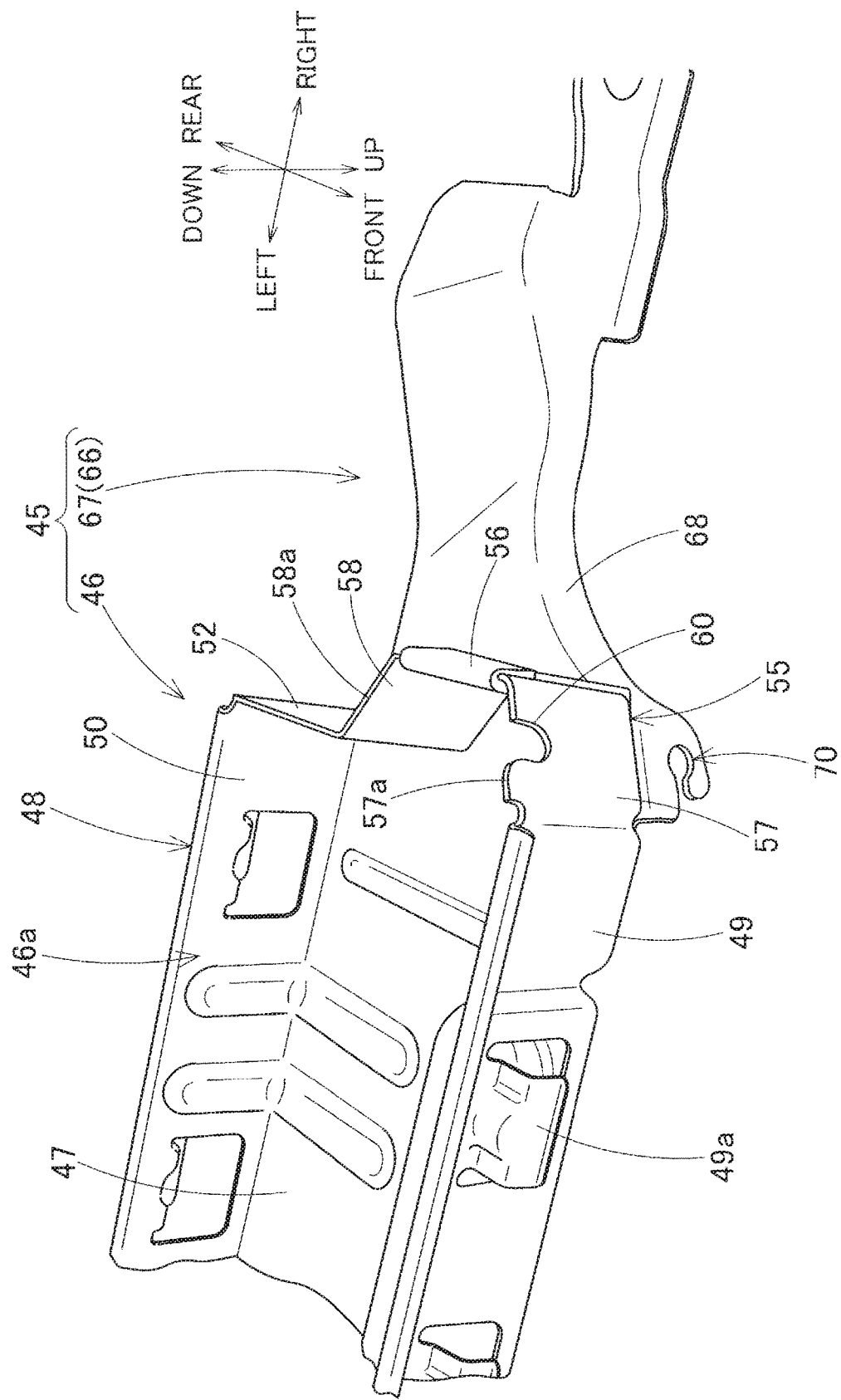
FIG. 8 is a partial enlarged perspective view of the case of FIG. 6 showing a protruding region of the case.

As can be seen in FIGS. 7 and 8, the front limiting wall 57 of the protruding region 55 of the illustrated embodiment is provided with a first groove 60 for receiving and retaining the harness body 31. The first groove 60 dents from the leading end 57a of the front limiting wall 57 towards the bottom wall 47 (i.e. towards an upper direction as mounted on board). More specifically, the first groove 60 is formed generally vertically generally at the center in width direction of the front limiting wall 57 so as to receive the harness body 31 from below (i.e. from an up and down direction). The leading end or bottom of the groove 60 is formed into a generally semicircular arch corresponding to a cross-sectional contour of the harness body 31.

The bracket section 65 of the illustrated embodiment includes a left bracket 66 which extends upward from a left end region of the bottom wall 47 of the case body 46 and a right bracket 67 which extends towards the right from a right end region of the bottom wall 47 of the case body 46. Each of the brackets 66 and 67 is designed to be mounted on a predetermined position of an underside of the glove box 1 at the leading end 66a/67a though not depicted in the drawings. The right bracket 67 includes, at a vicinity of the front edge, a flange 68 which rises upward for enhancing rigidity.

In the illustrated embodiment, a root region of the flange 68 is disposed generally immediately above the front limiting wall 57, as can be seen in FIG. 8, and the root region is provided with a second groove 70 for receiving and retaining the harness body 31. That is, the second groove 70 is disposed at a distance from the first groove 60 and above the first groove 60 on the same side as the first groove 60, as the airbag device S is mounted on the vehicle. More particularly, in the illustrated embodiment, the second groove 70 is formed to open toward the left so as to receive the harness body 31 from the left, and is formed into a generally circular arch corresponding to the cross-sectional contour of the harness body 31. That is, an opening direction (or inserting direction of the harness body 31) of the second groove 70 is intersectional with that of the first groove 60. In the illustrated embodiment, when mounted on the vehicle, the harness body 31 of the wire harness 30 as connected to the inflator body 26 once extends downwardly from the connector 32, then goes through the first groove 60 and turns round and extends upwards, and then goes through the second groove 70, as can be seen in FIGS. 10 and 11 such that the connector 33 is placed on the top plane of the right bracket 67. In the illustrated embodiment, as can be seen in FIG. 10, a lower end (i.e. a turn-round portion 31*c*) of the harness body 31 as mounted on the vehicle is disposed farther downward than the emergence opening 46*a* of the case 45 and covered with the airbag cover 6 on the lower side.

Mounting of the airbag device S on the vehicle is now described. Firstly, the retainer 36 is inserted into the airbag 20 via the not-shown insert opening and disposed such that the bolts 41 protrude out of the insert holes. Then the airbag 20 is folded up so as to fit in the case 45 (or case body 46), and wrapped up with a breakable wrapping member (not shown) for keeping the folded-up configuration. At this time, the insert opening which is to receive the inflator body 26 is exposed from the wrapping member.

Then the inflator body 26 as connected with the wire harness 30 is inserted into the airbag 20 (i.e. into the holding section 37 of the retainer 36) via the insert opening with the gas releasing section 27 in the lead. Thereafter, the airbag 20 and the inflator 25 disposed inside the airbag 20 are stored in the case 45 such that the bolts 41 go out of the bottom wall 47. At this time, the leading ends 57*a* and 58*a* of the front limiting wall 57 and rear limiting wall 58 of the protruding region 55 limit the range of motion of the harness body 31 of the wire harness 30 to some extent. Subsequently, the wire harness 30 is rotated together with the inflator body 26 such that the harness body 31 is placed in the first groove 60, then in the second groove 70. Then in that state, the bolts 41 protruding from the bottom wall 47 are fastened with the nuts 42, thus the airbag 20 and inflator 25 are mounted on the case 45. Then the connector 33 is fixed to the top plane of the right bracket 67 with the not-shown temporary fixing means. If then the airbag cover 6 is mounted on the case 45, an airbag module is completed. The airbag module is then secured to the underside of the glove box 1 with the use of the bracket section 65, and not-shown lead wires extending from the not-shown actuating circuit are connected to the connector 33 placed on the top plane of the right bracket 67. If then an undercover 3 (FIG. 1) is mounted, the airbag device S for knee protection is mounted on the vehicle.

After the airbag device S is mounted on the vehicle, if an actuating signal is fed to the inflator body 26, the inflator body 26 will emit an inflation gas out of the gas discharge ports 27*a* into the airbag 20. Then the airbag 20 will inflate and break the wrapping member, push the door 8 of the airbag cover 6, and the door 8 will open and allow the airbag 20 to emerge from the emergence opening 46*a* of the case 45 and be deployed upwardly and rearwardly to cover the rear surface 1*a* of the glove box 1, as indicated by double-dotted lines in FIG. 1.

The airbag device S for knee protection of the illustrated embodiment is configured such that the inflator 25 as connected with the wire harness 30 is stored in the case 45 in advance of mounting on the vehicle. To this end, the case 45 includes, in a side (i.e. in the right side wall 52) of the circumferential wall 48, the protruding region 55 that protrudes partially from the side wall 52 for housing the connector 32 of the wire harness 30. The protruding region 55 includes the stopper wall 56 that is opposed to the connector 32 in the axial direction of the inflator body 26. In the event that the inflator body 26 moves outwardly or towards the right in the axial direction at actuation of the inflator 25, the stopper wall 56 abuts against the inflator body 26 and prevents the inflator body 26 from further moving towards the right, thus holding an end plane of the connector 32 (the right end plane 26*b* of the inflator body 26 where the connector 32 is located) adequately such that the inflator body 26 may not drop out of the retainer 36 or airbag 20. The protruding region 55 further includes a pair of the limiting walls, i.e. the front limiting wall 57 and rear limiting wall 58, that extend from the stopper wall 56 and are disposed on both sides (front and rear sides) of the connector 32 in the direction orthogonal to the axial direction of the inflator body 26. The leading ends (i.e. lower ends as mounted on board) 57*a* and 58*a* of the front and rear limiting walls 57 and 58 are engageable with the wire harness 30 and limit the range of angle with respect to the inflator body 26 within which the wire harness 30, which extends in the direction orthogonal to the axial direction of the inflator body 26, is rotatable. With this configuration, merely by storing the inflator body 26 as connected with the wire harness 30 in the case 45, the wire harness 30 is brought into engagement with the leading end 57*a* of the front limiting wall 57 or the leading end 58*a* of rear limiting wall 58 and prevented from further rotating, such that the wire harness 30 and inflator body 26 are prevented from rotating freely with respect to the retainer 36. This facilitates handling of the wire harness 30 at the setting of the inflator 25 in the case 45.

Therefore, the airbag device S for knee protection of the illustrated embodiment is able to adequately hold the end portion of the inflator 25 where the wire harness 30 is disposed, and prevent the inflator 25 as connected with the wire harness 30 and stored in the case 45 from dropping out of the case 45 from a side of the wire harness 30 when the inflator 25 is actuated. Further, the airbag device S has ease of handling of the wire harness 30 and ease of positioning of the wire harness 30 with respect to the case 45.

In the airbag device S of the illustrated embodiment, the protruding region 55 has such a contour that the front limiting wall 57 and rear limiting wall 58 extend towards the stopper wall 58 while reducing a clearance between themselves, as viewed from below the emergence opening 46*a* of the case 45 (i.e. as viewed from an up and down direction). Although the case 45 is provided with the protruding region 55, this configuration limits a size of the protruding region 55, which contributes to size reduction of the case 45 as well. If the front limiting wall and rear limiting wall are formed to extend generally orthogonally to the stopper wall 56 such that the protruding region 55 forms a shape like a square channel, an increased amount of material will be required to form the case, thus increasing a weight of the case as well. If such an advantageous effect does not have to be considered, the protruding region may be formed into such a shape that the front limiting wall and rear limiting wall extend generally parallel to each other (in other words, generally orthogonally to the stopper wall).

Moreover, the airbag device S of the illustrated embodiment includes the first groove 60 that dents from the leading end 57a of the front limiting wall 57 of the protruding region 55, and the harness body 31 is retained in the first groove 60. This configuration prevents the airbag cover 6 from being interfered with the harness body 31 in assembling of the airbag device S, and also prevents the harness body 31 from rotating with respect to the case 45 during transportation of the airbag device S and in mounting of the airbag device S on a vehicle. Therefore, handling of the wire harness 31 will be further facilitated.

The airbag device S of the illustrated embodiment further includes the second groove 70 that is disposed on the same side as the front limiting wall 57 provided with the first groove 60 and at a distance from the first groove 60, and the harness body 31 is placed in the second groove 70. Due to retention by not only the first groove 60 but also the second groove 70, the harness body 31 will be further prevented from rotating with respect to the case 45, and prevented from engagement with surrounding members of the vehicle after the airbag device S is mounted on board. If such advantageous effects do not have to be considered, the case may be provided with no such grooves as the first groove 60 or second groove 70. If the case includes no such grooves, the wire harness may be fixed to an outer surface of the circumferential wall of the case with a temporary fixing means such as an adhesive tape.

In the airbag device S of the illustrated embodiment, especially, the first groove 60 and the second groove 70 are different from each other in opening direction or in inserting direction of the harness body 31. The opening directions or inserting directions of the first groove 60 and second groove 70 are generally orthogonal to each other. With this configuration, even if the harness body 31 comes off from one of the grooves 60 and 70, the harness body 31 will not come off from the other groove immediately and stay retained by the other groove.

Furthermore, the airbag device S of the illustrated embodiment is designed to be mounted on the vehicle with the emergence opening 46a of the case 45 facing downwardly. In that state, the harness body 31 extends downwardly from the connector 32, passes through the first groove 60, bends or turns round upward and passes through the second groove 70 above the first groove 60. With this configuration, if by chance a rainwater W trickles down the harness body 31, the rainwater W drips down from the lower end of the wire harness 31, i.e. from the turn-round portion 31c, as indicated with double-dotted lines in FIG. 10, thus the case 45 will be protected from invasion by the rainwater W. Especially, in the illustrated embodiment, the lower end (i.e. turn-round portion 31c) of the harness body 31 is located farther downward than the emergence opening 46a of the case 45, as can be seen in FIG. 10, and therefore, the case 45 will be protected further surely from invasion by the rainwater W. If such an advantageous effect does not have to be considered, the harness body does not have to be arranged to turn round.

The airbag device S for knee protection of the illustrated embodiment has been described as designed to be mounted on the vehicle with the emergence opening 46a of the case 45 facing downwardly. However, application of the invention should not be limited to the illustrated embodiment. The invention may be applied to an airbag device for knee protection which is adapted to be mounted on a vehicle with an emergence opening of a case directed rearward.

What is claimed is:

1. An airbag device for knee protection adapted to be mounted on a vehicle, comprising an airbag that is folded up, an inflator that feeds the airbag with an inflation gas, a case that houses the airbag and the inflator, and a wire harness that is connected to the inflator for connection with an airbag actuating circuit of the vehicle,
wherein the case includes a generally quadrangular bottom wall, a generally square tubular circumferential wall that extends from a circumferential edge of the bottom wall, and an emergence opening which allows airbag deployment;
wherein the inflator includes;
a generally cylindrical inflator body that includes a plurality of gas discharge ports disposed at a first end in an axial direction of the inflator body, and a connection port disposed at a second end in the axial direction for connection with the wire harness; and
a retainer that is used to mount the inflator body and the airbag on the case, the retainer including a holding section which clamps an outer circumference of the inflator body, and a mounting means that protrudes from the holding section in a direction orthogonal to the axial direction of the inflator body, the inflator body being mounted on the case by fixing of the mounting means to the bottom wall of the case;
wherein the wire harness includes a connector that is connected to the connection port of the inflator body and a harness body that extends from the connector in the direction orthogonal to the axial direction of the inflator body for connection with the airbag actuating circuit;
wherein the case further includes a protruding region that protrudes partially from the circumferential wall for housing the connector of the wire harness; and
wherein the protruding region includes;
a stopper wall that is opposed to the connector of the wire harness in the axial direction of the inflator body and prevents the inflator body from dropping out of the case; and
a pair of limiting walls that extend from the stopper wall and are disposed on both sides of the connector in the direction orthogonal to the axial direction of the inflator body, each of the limiting walls being engageable with the wire harness by a leading end thereof and limiting a range of angle with respect to the inflator body within which the wire harness is rotatable.

2. The airbag device of claim 1, wherein the protruding region has such a contour that the limiting walls extend towards the stopper wall while reducing a clearance between themselves, as viewed from the front of the emergence opening of the case.

3. The airbag device of claim 1, wherein either one of the limiting walls is provided with a first groove that dents from the leading end, and the harness body is placed and retained in the first groove.

4. The airbag device of claim 3, wherein the harness body is also placed and retained in a second groove that is disposed on a same side as the limiting wall provided with the first groove and at a distance from the first groove.

5. The airbag device of claim 4, the first groove and the second groove are different from each other in opening direction to receive the harness body.

6. The airbag device of claim 4 adapted to be mounted on the vehicle in a state where the emergence opening of the case faces downwardly and where the harness body is so arranged to extend once downwardly from the connector, pass through the first groove, turn round upward and pass through the second groove which is disposed above the first groove.

7. The airbag device of claim 6, wherein a lower end of the harness body is positioned farther downward than the emergence opening of the case.

\* \* \* \* \*